US012197318B2

(12) United States Patent
Muthiah et al.

(10) Patent No.: US 12,197,318 B2
(45) Date of Patent: Jan. 14, 2025

(54) FILE SYSTEM INTEGRATION INTO DATA MINING MODEL

(71) Applicant: Western Digital Technologies, Inc., San Jose, CA (US)

(72) Inventors: Ramanathan Muthiah, Karnataka (IN); Adarsh Sreedhar, Karnataka (IN); Niraj Srimal, Karnataka (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 63 days.

(21) Appl. No.: 17/737,852

(22) Filed: May 5, 2022

(65) Prior Publication Data

US 2023/0359550 A1    Nov. 9, 2023

(51) Int. Cl.
*G06F 12/02* (2006.01)
*G06F 3/06* (2006.01)

(52) U.S. Cl.
CPC ........ *G06F 12/0215* (2013.01); *G06F 3/0604* (2013.01); *G06F 3/0658* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 9,857,984 B2 * | 1/2018 | Nemoto | ................ | G06F 3/0611 |
| 10,296,240 B2 | 5/2019 | Deneui et al. | | |
| 10,671,309 B1 * | 6/2020 | Glynn | ................... | G06F 3/0683 |
| 10,871,910 B1 * | 12/2020 | Alrod | .................... | G06F 3/0619 |
| 10,990,521 B1 | 4/2021 | Hwang | | |
| 11,269,764 B2 * | 3/2022 | Hahn | ..................... | G06F 3/0625 |
| 2012/0110239 A1 | 5/2012 | Goss et al. | | |
| 2014/0006707 A1 * | 1/2014 | Bandic | ................ | G06F 12/0253 |
| | | | | 711/E12.019 |
| 2014/0089565 A1 * | 3/2014 | Lee | ......................... | G06F 3/061 |
| | | | | 711/103 |
| 2016/0313943 A1 * | 10/2016 | Hashimoto | ............. | G06F 3/064 |
| 2017/0153842 A1 * | 6/2017 | Iwabuchi | .............. | G06F 3/0676 |
| 2020/0241795 A1 * | 7/2020 | Yang | ...................... | G06F 3/0613 |
| 2021/0373808 A1 * | 12/2021 | Liu | ......................... | G06F 3/0604 |
| 2021/0405901 A1 * | 12/2021 | Oh | .......................... | G06F 3/0604 |
| 2023/0051018 A1 * | 2/2023 | Won | ....................... | G06F 3/0679 |

FOREIGN PATENT DOCUMENTS

| | | |
|---|---|---|
| CN | 103984640 B | 6/2017 |
| CN | 109783398 B | 9/2020 |
| CN | 109062915 B | 11/2020 |

\* cited by examiner

*Primary Examiner* — Charles Rones
*Assistant Examiner* — Ryan Dare
(74) *Attorney, Agent, or Firm* — ARENTFOX SCHIFF LLP

(57) ABSTRACT

Aspects of a storage device including a memory and a controller are provided. The controller may collect, by an association rule mining (ARM) model, file system data from a host file system, the file system data defining at least one attribute of a file. The controller may receive, from the host, a memory command associated with the file. The controller can associate, by the ARM model, the at least one attribute with the file. The controller may perform the memory command based on the association of the at least one attribute with the file.

12 Claims, 13 Drawing Sheets

700

702 — perform the memory command based on the association of the at least one attribute with the file 704 — write the file to a sequential logical block when the file comprises sequential data 706 — write the file to random logical block when the file comprises random data

800

802
perform the memory command based on the association of the at least one attribute with the file 804
associate a first one or more logical block addresses (LBAs) with the owner 806
write the file to the first one or more LBAs associated with the owner 808
associate a second one or more LBAs with another owner 810
receive, from the host, a write command associated with another file 812
write the other file to the second one or more LBAs associated with the other owner

FIG. 8

FILE SYSTEM INTEGRATION INTO DATA MINING MODEL

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of Not-And (NAND) flash memory cells on one or more dies. Flash memory may be found in solid-state devices (SSDs), Secure Digital (SD) cards, Universal Serial Bus (USB) cards, and the like.

In In digital storage/memory devices, there may be associations between host commands that are not recognized because the storage/memory devices lack context of the files associated with the host commands. For example, conventional storage/memory devices may not have any process or method of learning about attributes that define the data being stored. However, when serving a client/hosts, such operations may be suboptimal and may lead to delayed (sequential or random) read latencies and impaired throughput.

SUMMARY

Certain aspects are directed to a storage device. In some examples, the storage device includes a memory and a controller coupled to the memory. In some examples, the controller is configured to parse, by an association rule mining (ARM) model, file system data from a host file system, the file system data defining at least one attribute of a file. In some examples, the controller is configured to receive, from the host, a memory command associated with the file. In some examples, the controller is configured to associate, by the ARM model and in response to the memory command, the at least one attribute with the file. In some examples, the controller is configured to perform the memory command based on the association of the at least one attribute with the file.

Certain aspects are directed to a storage device. In some examples, the storage device includes a memory and a controller coupled to the memory. In some examples, the controller is configured to parse, by an association rule mining (ARM) model, file system data from a host file system, the file system data defining at least one attribute of a file. In some examples, the controller is configured to receive, from the host, a memory command associated with the file. In some examples, the controller is configured to determine a range of logical block addresses (LBAs) corresponding to the file based on the at least one attribute of the file. In some examples, the controller is configured to precache data associated with the file and within the range of LBAs.

Certain aspects are directed to a storage device. In some examples, the storage device includes a memory and a controller coupled to the memory. In some examples, the controller is configured to parse, by an association rule mining (ARM) model, file system data from a host file system, the file system data defining at least one attribute of a file. In some examples, the controller is configured to receive, from the host, a memory command associated with the file. In some examples, the controller is configured to estimate a time of completion of the memory command based on the at least one attribute of the file. In some examples, the controller is configured to schedule one or more background tasks to begin after the estimated time of completion.

BRIEF DESCRIPTION OF THE DRAWINGS

Various aspects of the present invention will now be presented in the detailed description by way of example, and not by way of limitation, with reference to the accompanying drawings, wherein:

FIG. 8 is a flow diagram illustrating an example method for grouping and optimizing garbage collection in a storage device using a storage controller that utilizes an ARM model.

DETAILED DESCRIPTION

Figure 1:
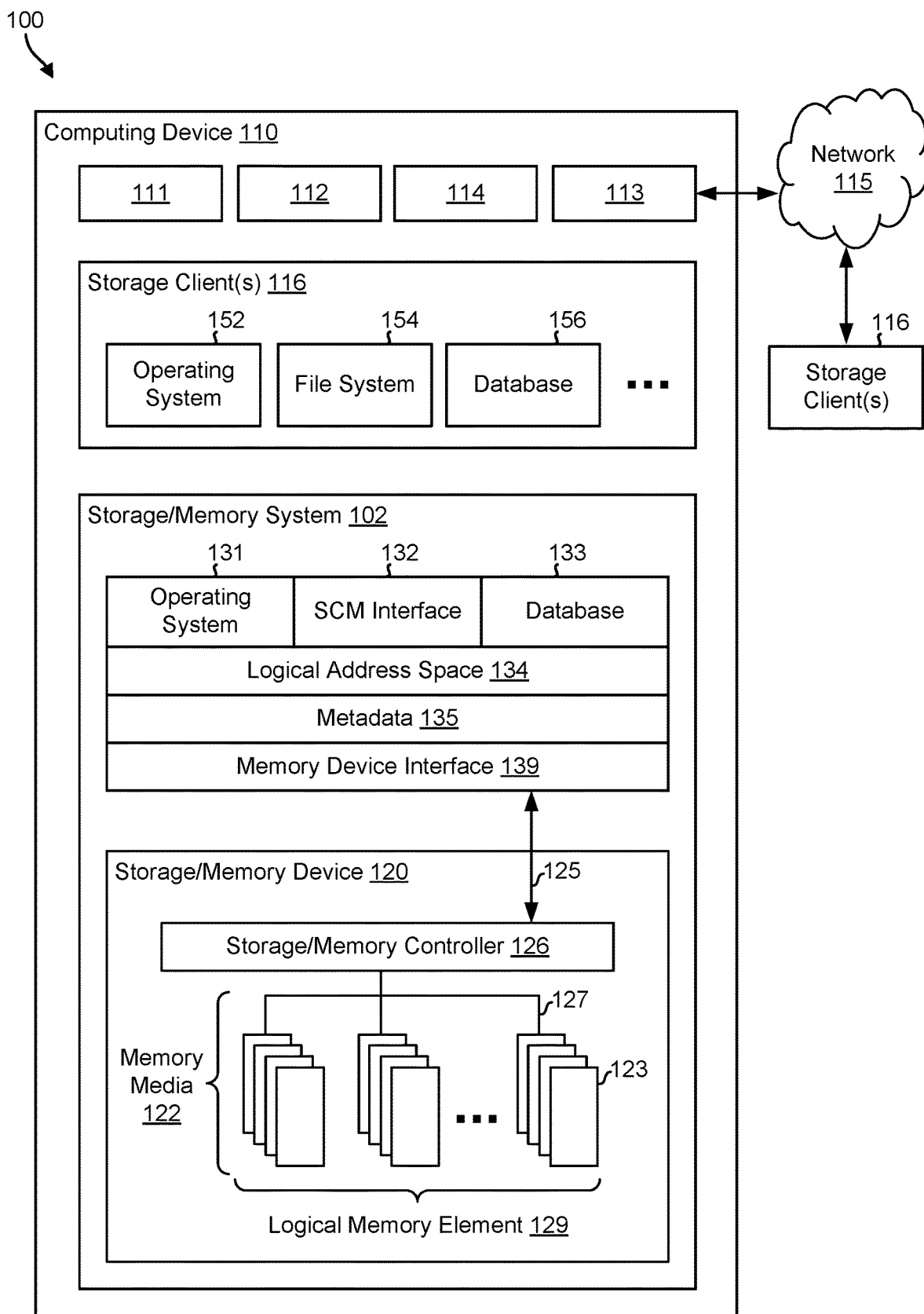
FIG. 1 is a block diagram illustrating an exemplary host/client and file system, as well as a network providing communication with other hosts/clients.

When a host device writes data to and reads data from a storage device, the host writes and reads data in terms of logical block addresses (LBAs). Similarly, when the host device erases data from the storage device, the erase command will typically indicate a particular LBA associated with the data to be erased. The storage device typically has a memory controller configured to translate the LBAs to physical addresses of memory cells or logical blocks (e.g., one physical block or more than one physical blocks interleaved together) on the storage device. As one example, a flash memory device may include a flash transfer layer (FTL) or media management layer (MML) that performs a logical address to physical address (L2P) translation.

In many scenarios, there may be one or more associations between two host commands, files, and/or storage locations. For example, a movie file and its corresponding subtitle files may have been written to different locations of the storage device, yet the host may issue concurrent read commands for both. In another example, a game may load different environments based on user control/feedback, and the software required to load the environment may be stored in different locations that do not have any cohesiveness defined by the game. Neither the host nor the storage device may be aware of the associations between files or storage locations because they are largely dependent on the user or the software accessing the storage device.

However, if the storage device is made aware of certain associations, the functionality of the storage device and the host may be improved. For example, the storage device may include a storage controller that is configured to perform internal storage operations such as garbage collection, read look ahead (RLA), L2P prefetch, wear leveling (WL), etc. Such functions may be optimized based on associations made between LBA values and/or ranges. In certain aspects, the storage controller may determine associations using a model association rule mining (ARM) algorithm to associate host requests with LBA ranges/values. In one example, the ARM model may associate host requests on multiple logical regions in a transaction to enhance storage controller performance of writes, reads, and other internal storage operations. In this example, a transaction may relate to an interval between power-on and power-off of the storage device, or a burst/number of host commands involving multiple LBA ranges. In certain aspects, the ARM model may determine the associations based on file system (FS) data and host requests (e.g., LBA patterns).

In a first example, the ARM model may parse read-only access properties from FS data (e.g., FS data associated with new technology file system (NTFS), 32-bit file allocation table (FAT32), etc.). For example, FS data may include logical data indicative of what files are associated with what LBA ranges/values, as well as read-only access properties that indicate whether the files are read-only. Based on this information, the storage controller optimizes the functionality of the storage device by grouping read-only data into logical blocks with a relatively high program erase count (PEC) (e.g., based on PEC satisfying a threshold condition, such as the PEC reaching a pre-configured value).

In a second example, an NTFS file system may provide a link tracking service, such as a distributed link tracking service (DLTS), configured to track and maintain shortcut links and/or object linking and embedding (OLE) information as files or objects corresponding to a link are modified or moved. A distributed link tracking client (e.g., TrkWks) associated with the link tracking service may maintain object links between FS files (e.g., within a computer or across computers in a network domain) and a directory of the FS files on the storage device. Such links may use an object identifier (ID) uniquely identifying a file and/or directory on the storage device.

In this example, the ARM model may parse FS data from the links to determine properties of one or more files stored on the storage device. For example, link data may provide the ARM model with relationships between files on the computer network, such as file type and information that can be used for prefetching. In certain aspects, the ARM model may use the link data to associate a "file type" with multiple files and group the multiple files according to file type. For example, based on the link data collected by the ARM, the storage controller may segregate file data across different blocks according to the file type. As such, all like-types of files may be grouped in common blocks. It should be noted that the FS of the storage device may be stored (e.g., by the host) in the storage device itself (e.g., in a flash memory, wherein the FS may be stored as another LBA data). Hence, the ARM model may parse the FS that is already stored in flash. In other words, to parse the FS data, the device may not necessarily need to request the data from the host.

In one example, a user may be running a gaming application and simultaneously writing a movie file to a storage device via a host computing system. Here, based on the FS data, the ARM may determine that the movie file is a particular type of file associated it movies and/or sequential data. Based on this information, the storage controller may determine to store the movie file in sequential blocks. Similarly, based on the FS data, the ARM may determine that data associated with the game is gaming data and/or random data. Based on this information, the storage controller may determine to store the gaming data in random blocks. Accordingly, the movie data and the gaming data are segregated at the source blocks. Thus, the game data may be erased once the game ends, and little to no garbage collection will be required because the movie data and the gaming data do not share source blocks. That is, the random blocks can simply be erased without having to move valid movie data from a block shared with gaming data prior to erasing the gaming data.

In a third example, the ARM may use the FS information to group data stored in the storage device based on one or more of an owner or group owner of the stored data. Accordingly, the storage controller may consolidate logical data together in logical blocks for to improve performance of the storage device. For example, FS data (e.g., data that is stored with the host) may include information about host files in the storage device, including "file owner" and/or "group owner." The ARM may parse this FS data, and the storage controller may associate a range of logical addresses with a particular owner. As such, data stored on the storage device may be segregated according to an owner of the data.

In a fourth example, the FS data may be used to optimize precaching of L2P pages. In one example, using FS data, the ARM may determine that a 1 GB file begins at LBA X and ends at LBA Y. Thus, if the host issues a read command for reading the movie data, the storage controller will know that it may precache or perform RLA up to LBA Y. That is, the storage controller may stop precaching or restrict RLA so that no precaching is performed beyond LBA Y. In this example, X and Y are LBA addresses.

In a fifth example, the ARM may use FS data to estimate idle time, during which the storage device or aspects of the storage device (e.g., the storage controller) may enter into a low power or idle state of operation. For example, the ARM may parse FS data that includes an indication of characteristics of certain files (e.g., file types, owners, file associations, etc.). Accordingly, the ARM may determine that a particular file request is associated with a movie, and the ARM may determine the last LBA of the movie. Based on this information, the storage controller may estimate a time that the movie will end. Based on this time, the storage controller may schedule background operations (e.g., garbage collection and/or any other suitable background operation of a storage device) to begin at a time associated with the end of the movie (e.g., a time when requests for movie data from the host will end).

In a sixth example, the ARM may use FS data to determine a type of data that is the subject of a write request issued by the host. Specifically, the ARM may determine if the data is part of a sequential data type (e.g., a movie) or a random data type (e.g., game). In conventional systems, a storage controller may route data to be written to a random open block. However, in this example, once the type of data is established, the storage controller may route sequential data to sequential open blocks, or route random data to random open blocks.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host will be presented. These aspects are well suited for flash storage devices, such as SSDs, USB and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

FIG. 1 is a schematic block diagram illustrating an embodiment of a system 100 and computing device 110 for incorporating file system data as an input to a data mining model. In some embodiments, a storage/memory device 120 can at least partially operate on and/or in communication with a nonvolatile and/or volatile storage/memory system 102 of a computing device 110, which can include a processor 111, volatile memory 112, a communication interface 113, and a non-transitory, computer readable storage medium 114. The processor 111 can include one or more central processing units, one or more general-purpose processors, one or more application-specific processors, one or more virtual processors (e.g., the computing device 110 can be a virtual machine operating within a host), one or more processor cores, or the like. The communication interface 113 can include one or more network interfaces configured to communicatively couple the computing device 110 and/or memory controller 126 to a communication network 115, such as an Internet protocol (IP) network, a storage area network (SAN), wireless network, wired network, or the like. The computer readable storage medium 114 can include executable instructions configured to cause the computing device 110 (e.g., processor 111) to perform steps of one or more of the methods disclosed herein.

The storage/memory device 120, in various embodiments, can be disposed in one or more different locations relative to the computing device 110. In one embodiment, the memory device 120 includes one or more non-volatile and/or volatile memory elements 123, such as semiconductor chips or packages or other integrated circuit devices disposed on one or more printed circuit boards, storage housings, and/or other mechanical and/or electrical support structures. For example, the memory device 120 can include one or more direct inline memory module (DIMM) cards, one or more expansion cards and/or daughter cards, a memory card, a universal serial bus (USB) drive, a solid-state-drive (SSD) or other hard drive device, and/or can have another memory and/or storage form factor. The memory device 120 can be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The memory device 120, in one embodiment, can be disposed on a memory bus of a processor 111 (e.g., on the same memory bus as the volatile memory 112, on a different memory bus from the volatile memory 112, in place of the volatile memory 112, or the like). In a further embodiment, the memory device 120 can be disposed on a peripheral bus of the computing device 110, such as a peripheral component interconnect express (PCI Express or PCIe) bus, a SATA bus, a PATA bus, an SCSI bus, a FireWire bus, a fiber channel connection, a USB, a PCIe, or PCIe-AS bus, or the like. In another embodiment, the memory device 120 can be disposed on a data network 115, such as an Ethernet network, an InfiniBand network, SCSI RDMA over a network 115, a SAN, a LAN, a WAN such as the Internet, another wired and/or wireless network 115, or the like.

According to various embodiments, a memory controller 126 can manage one or more memory devices 120 and/or memory elements 123. The memory device(s) 120 can include recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a memory device 120). Memory units and/or regions can include, but are not limited to: pages, memory divisions, blocks, sectors, collections or sets of physical storage locations (e.g., logical pages, logical blocks), or the like.

A device driver and/or the memory controller 126, in certain embodiments, can present a logical address space 134 to the storage clients 116. As used herein, a logical address space 134 refers to a logical representation of memory resources. The logical address space 134 can include a plurality (e.g., range) of logical addresses. As used herein, a logical address refers to any identifier for referencing a memory resource (e.g., data), including, but not limited to a logical block address (LBA), cylinder/head/sector (CHS) address, a file name, an object identifier, an index node (inode), a universally unique identifier (UUID), a globally unique identifier (GUID), a hash code, a signature, an index entry, a range, an extent, or the like.

A device driver for the memory device 120 can maintain metadata 135, such as a logical to physical address mapping structure to map logical addresses of the logical address space 134 to media storage locations on the memory device(s) 120. A device driver can be configured to provide storage services to one or more storage clients 116. The storage clients 116 can include local storage clients 116 operating on the computing device 110 and/or remote storage clients 116 accessible via the network 115 and/or network interface 113. The storage clients 116 can include, but are not limited to: operating systems 152, file systems 154, database applications 156, server applications, kernel-level processes, user-level processes, applications, and the like.

A device driver can be communicatively coupled to one or more memory devices 120. The one or more memory devices 120 can include different types of memory devices including, but not limited to: solid-state storage devices, semiconductor storage devices, SAN storage resources, volatile memory devices, non-volatile memory devices, or the like. The one or more memory devices 120 can include one or more respective memory controllers 126 and memory media 122. A device driver can provide access to the one or more memory devices 120 via a traditional block I/O interface 131. Additionally, a device driver can provide access to enhanced functionality through the storage class memory (SCM) interface 132. The metadata 135 can be used to manage and/or track data operations performed through any of the Block I/O interface 131, SCM interface 132, cache interface 133, or other related interfaces.

The cache interface 133 can expose cache-specific features accessible via a device driver for the memory device 120. Also, in some embodiments, the SCM interface 132 presented to the storage clients 116 provides access to data transformations implemented by the one or more memory devices 120 and/or the one or more memory controllers 126.

A device driver can present a logical address space 134 to the storage clients 116 through one or more interfaces. As discussed above, the logical address space 134 can include a plurality of logical addresses, each corresponding to respective media locations on one or more memory devices 120. A device driver can maintain metadata 135 comprising any-to-any mappings between logical addresses and media locations, or the like.

A device driver can further include and/or be in communication with a memory device interface 139 configured to transfer data, commands, and/or queries to the one or more memory devices 120 over a bus 125, which can include, but is not limited to: a memory bus of a processor 111, a peripheral component interconnect express (PCI express or PCIe) bus, a SATA bus, a parallel ATA bus, a SCSI, FireWire, fiber channel, a USB, a PCIe or PCIe-AS bus, a network 115, Infiniband, SCSI RDMA, or the like. The memory device interface 139 can communicate with the one or more memory devices 120 using IO-CTL command(s), IO-CTL command extension(s), remote direct memory access, or the like.

The communication interface 113 can include one or more network interfaces configured to communicatively couple the computing device 110 and/or the memory controller 126 to a network 115 and/or to one or more remote, network-accessible storage clients 116. The storage clients 116 can include local storage clients 116 operating on the computing device 110 and/or remote storage clients 116 accessible via the network 115 and/or the network interface 113. The memory controller 126 is part of and/or in communication with one or more memory devices 120. Although FIG. 1 depicts a single memory device 120, the disclosure is not limited in this regard and could be adapted to incorporate any number of memory devices 120, a combination of one or more volatile memory devices 120 and one or more non-volatile memory devices 120, or the like.

The memory device 120 can include one or more elements 123 of memory media 122. In one embodiment, an element 123 of memory media 122 includes a volatile memory medium 122, such as random-access memory (RAM), dynamic RAM (DRAM), synchronous DRAM (SDRAM), double data rate (DDR) SDRAM, static RAM (SRAM), thyristor RAM (T-RAM), zero-capacitor RAM (Z-RAM), or the like. In certain embodiments, an element 123 of memory media 122 includes a non-volatile memory medium 122, such as ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS) memory, programmable metallization cell (PMC) memory, conductive-bridging RAM (CBRAM), magneto-resistive RAM (MRAM), magnetic storage media (e.g., hard disk, tape), optical storage media, or the like. Thus, the memory device 120 may rely, for example, on stored voltage levels or stored resistance levels. The one or more elements 123 of memory media 122, in certain embodiments, include SCM.

While legacy technologies such as NAND flash can be block and/or page addressable, storage class memory, in one embodiment, is byte addressable. In further embodiments, storage class memory can be faster and/or have a longer life (e.g., endurance) than NAND flash; can have a lower cost, use less power, and/or have a higher storage density than DRAM; or offer one or more other benefits or improvements when compared to other technologies. For example, storage class memory can include one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 can more generally include one or more non-volatile recording media capable of recording data, which can be referred to as a non-volatile memory medium, a non-volatile storage medium, or the like. Further, the nonvolatile memory device 120, in various embodiments, can include a non-volatile recording device, a non-volatile memory device, a non-volatile storage device, or the like. Similarly, a nonvolatile memory element 123, in various embodiments, can include a non-volatile recording element, a non-volatile memory element, a non-volatile storage element, or the like.

The non-volatile memory media 122 can include one or more non-volatile memory elements 123, which can include, but are not limited to: chips, packages, planes, die, or the like. A non-volatile memory controller 126 can be configured to manage data operations on the nonvolatile memory media 122, and can include one or more processors, programmable processors (e.g., FPGAs), ASICs, micro-controllers, or the like. In some embodiments, the nonvolatile memory controller 126 is configured to store data on and/or read data from the nonvolatile memory media 122, to transfer data to/from the non-volatile memory device 120, and so on.

The non-volatile memory controller 126 can be communicatively coupled to the non-volatile memory media 122 by way of a bus 127. The bus 127 can include an I/O bus for communicating data to/from the non-volatile memory elements 123. The bus 127 can further include a control bus for communicating addressing, and other command and control information to the non-volatile memory elements 123. In some embodiments, the bus 127 can communicatively couple the non-volatile memory elements 123 to the non-volatile memory controller 126 in parallel. This parallel access can allow the non-volatile memory elements 123 to be managed as a group, forming a logical memory element 129. The logical memory element can be partitioned into respective logical memory units (e.g., logical pages) and/or logical memory divisions (e.g., logical blocks). The logical memory units can be formed by logically combining physical memory units of each of the non-volatile memory elements.

The non-volatile memory controller 126 can include and/or be in communication with a device driver executing on the computing device 110. A device driver can provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver can provide SCM interface 132, which can provide other storage services to the storage clients 116. In some embodiments, the SCM interface 132 can include extensions to the block device interface 131 (e.g., storage clients 116 can access the SCM interface 132 through extensions or additions to the block device interface 131). Alternatively, or in addition, the SCM interface 132 can be provided as a separate API, service, and/or library. A device driver can be further configured to provide a cache interface 133 for caching data using the non-volatile memory system 102. A device driver can further include a non-volatile memory device interface 139 that is configured to transfer data, commands, and/or queries to the non-volatile memory controller 126 over a bus 125, as described above.

Figure 2:
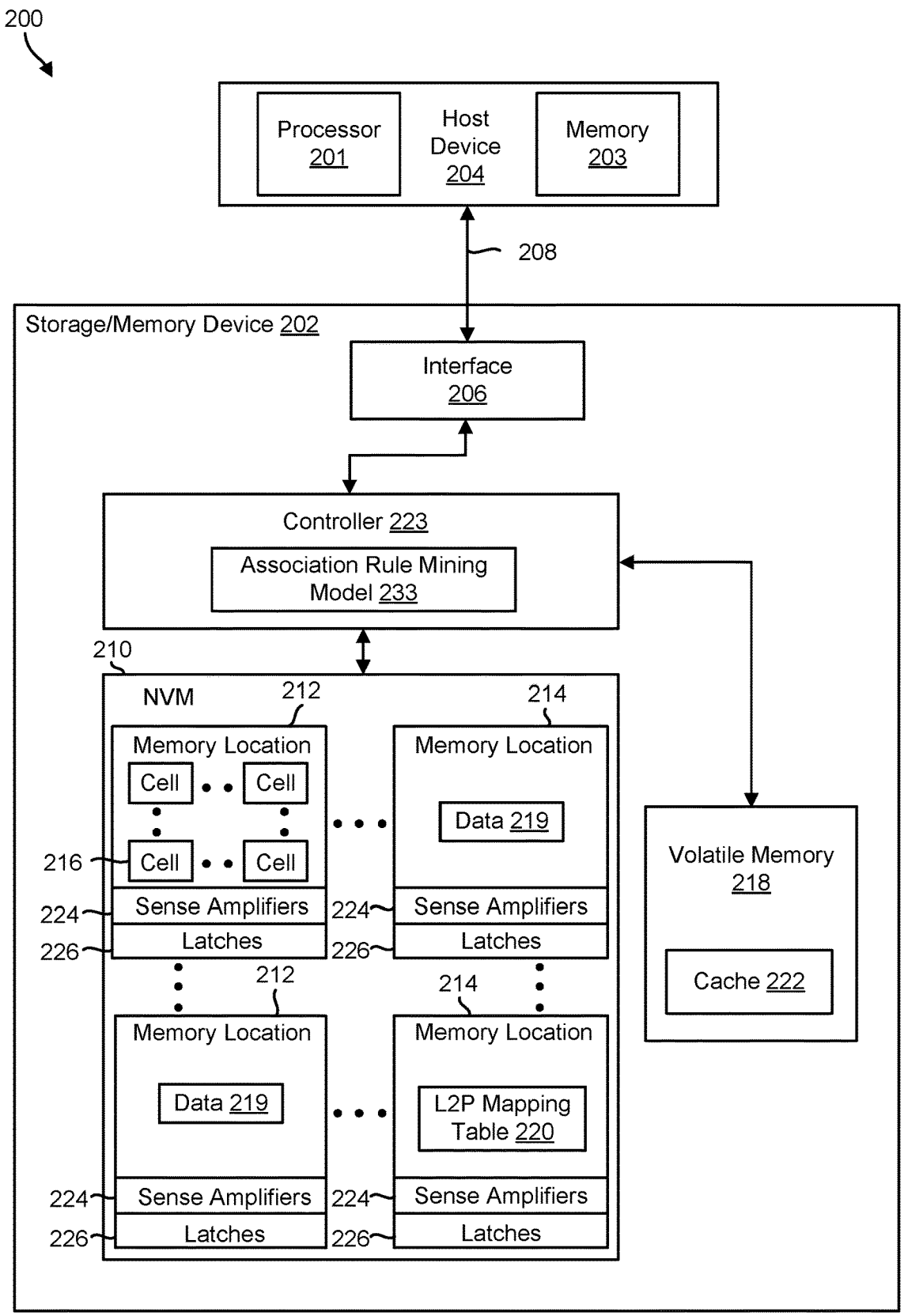
FIG. 2 is a block diagram illustrating an exemplary embodiment of a storage device in communication with a host.

FIG. 2 shows an exemplary block diagram 200 of a storage device 202 which communicates with a host device 204 (also "host") according to an exemplary embodiment. The host 204 and the storage device 202 may form a system, such as a computer system (e.g., server, desktop, mobile/laptop, tablet, smartphone, etc.). The components of FIG. 2 may or may not be physically co-located. In this regard, the host 204 may be located remotely from storage device 202. Although FIG. 2 illustrates that the host 204 is shown separate from the storage device 202, the host 204 in other embodiments may be integrated into the storage device 202, in whole or in part. Alternatively, the host 204 may be distributed across multiple remote entities, in its entirety, or alternatively with some functionality in the storage device 202.

Those of ordinary skill in the art will appreciate that other exemplary embodiments can include more or less than those elements shown in FIG. 2 and that the disclosed processes can be implemented in other environments. For example, other exemplary embodiments can include a different number of hosts communicating with the storage device 202, or multiple storage devices 202 communicating with the host(s).

The host device 204 may store data to, and/or retrieve data from, the storage device 202. The host device 204 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 204 may include at least one processor 201 and a host memory 203. The at least one processor 201 may include any form of hardware capable of processing data and may include a general-purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 203 may be used by the host device 204 to store data or instructions processed by the host or data received from the storage device 202. In some examples, the host memory 203 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 203 may include volatile memory, such as random-access memory (RAM), dynamic random-access memory (DRAM), static RAM (SRAM), and synchronous dynamic RAM (SDRAM (e.g., DDR1, DDR2, DDR3, DDR3L, LPDDR3, DDR4, and the like). The host memory 203 may also include both non-volatile memory and volatile memory, whether integrated together or as discrete units.

The host interface 206 is configured to interface the storage device 202 with the host 204 via a bus/network 208, and may interface using, for example, Ethernet or WiFi, or a bus standard such as SATA, PCIe, SCSI, or SAS, among other possible candidates. Alternatively, the host interface 206 may be wireless, and may interface the storage device 202 with the host 204 using, for example, cellular communication (e.g., 5G NR, 4G LTE, 3G, 2G, GSM/UMTS, CDMA One/CDMA2000, etc.), wireless distribution methods through access points (e.g., IEEE 802.11, WiFi, HiperLAN, etc.), infra-red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 202 includes a memory. For example, in the exemplary embodiment of FIG. 2, the storage device 202 may include a non-volatile memory (NVM) 210 for persistent storage of data received from the host 204. The NVM 210 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 210 may include a plurality of memory locations 212 which may store system data for operating the storage device 202 or user data received from the host for storage in the storage device 202. For example, the NVM may have a cross-point architecture including a 2-D NAND array of memory locations 212 having n rows and m columns, where m and n are predefined according to the size of the NVM. In the exemplary embodiment of FIG. 2, each memory location 212 may be a die 214 including multiple planes each including multiple blocks of multiple cells 216. Alternatively, each memory location 212 may be a plane including multiple blocks of the cells 216. The cells 216 may be single-level cells, multi-level cells, triple-level cells, quad-level cells, and/or penta-level cells, for example. Other examples of memory locations 212 are possible; for instance, each memory location may be a block or group of blocks. Each memory location may include one or more blocks in a 3-D NAND array. Each memory location 212 may include one or more logical blocks which are mapped to one or more physical blocks. Alternatively, the memory and each memory location may be implemented in other ways known to those skilled in the art.

The storage device 202 also includes a volatile memory 218 that can, for example, include a DRAM or a SRAM. Data stored in volatile memory 218 can include data read from the NVM 210 or data to be written to the NVM 210. In this regard, the volatile memory 218 can include a write buffer or a read buffer for temporarily storing data. While FIG. 2 illustrates the volatile memory 218 as being remote from a controller 223 of the storage device 202, the volatile memory 218 may be integrated into the controller 223.

The memory (e.g., NVM 210) is configured to store data 219 received from the host device 204. The data 219 may be stored in the cells 216 of any of the memory locations 212. As an example, FIG. 2 illustrates data 219 being stored in different memory locations 212, although the data may be stored in the same memory location. In another example, the memory locations 212 may be different dies, and the data may be stored in one or more of the different dies.

Each of the data 219 may be associated with a logical address. For example, the NVM 210 may store a logical-to-physical (L2P) mapping table 220 for the storage device 202 associating each data 219 with a logical address. The L2P mapping table 220 stores the mapping of logical addresses specified for data written from the host 204 to physical addresses in the NVM 210 indicating the location(s) where each of the data is stored. This mapping may be performed by the controller 223 of the storage device. The L2P mapping table may be a table or other data structure which includes an identifier such as a logical block address (LBA) associated with each memory location 212 in the NVM where data is stored. While FIG. 2 illustrates a single L2P mapping table 220 stored in one of the memory locations 212 of NVM to avoid unduly obscuring the concepts of FIG. 2, the L2P mapping table 220 in fact may include multiple tables stored in one or more memory locations of NVM.

The controller 223 may include an association rule mining (ARM) model 233 (e.g., an algorithm or model for identifying patterns of file access and file characteristics). The controller 223 may use the ARM model 233 to discover relationships between the attributes of files maintained by a file system (e.g., file system 154 of FIG. 1) without requiring semantics of the data. Using the ARM model 233, the controller 223 may automatically generate inferred associations between the attributes of a file and an LBA of the file, as described in more detail below.

Figure 3:
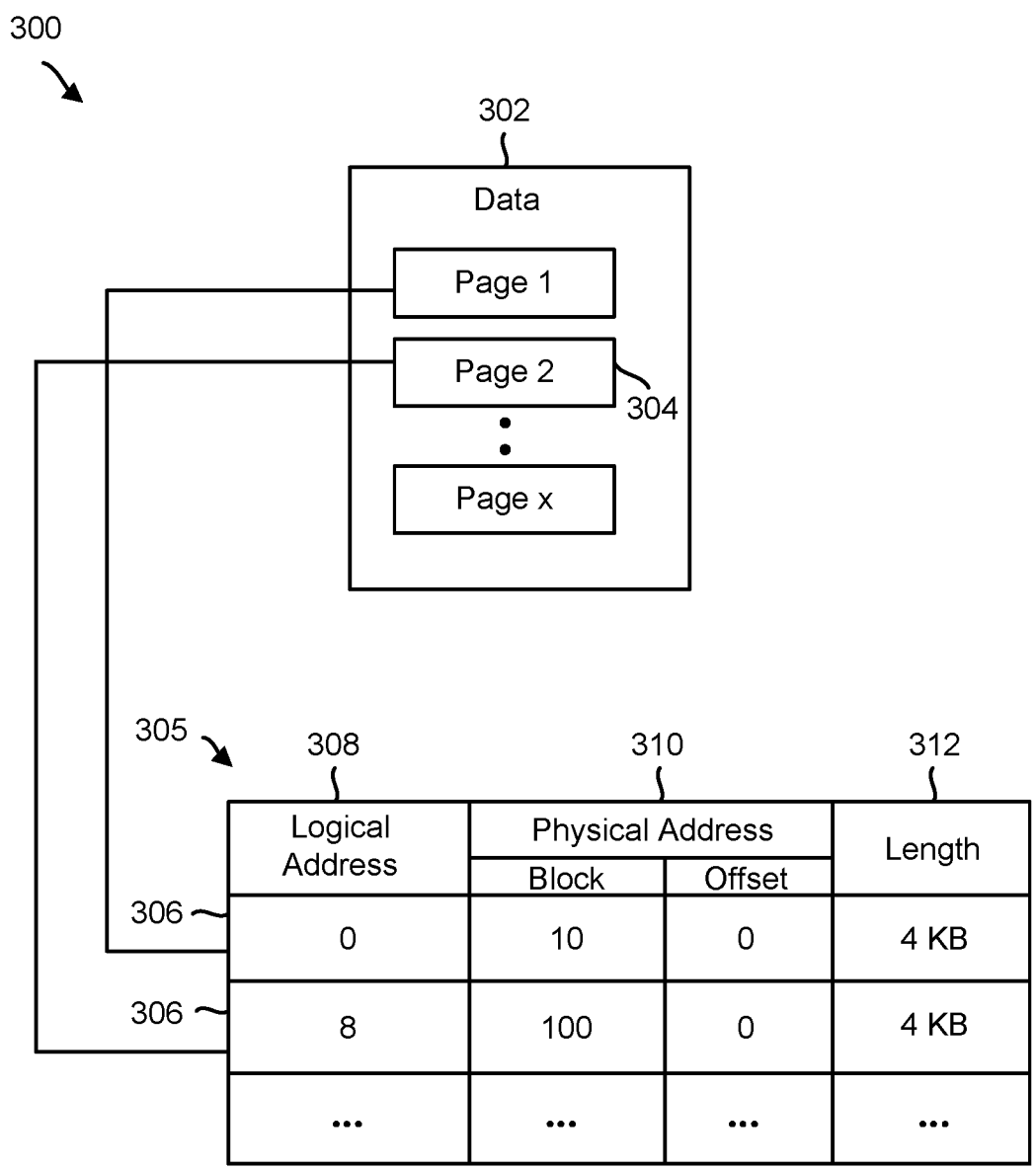
FIG. 3 is a conceptual diagram illustrating an example of a logical-to-physical mapping table in a non-volatile memory of the storage device of FIG. 2.

FIG. 3 is a conceptual diagram 300 of an example of an L2P mapping table 305 illustrating the mapping of data 302 received from a host device to logical addresses and physical addresses in the NVM 210 of FIG. 2. The data 302 may correspond to the data 219 in FIG. 2, while the L2P mapping table 305 may correspond to the L2P mapping table 220 in FIG. 2. In one exemplary embodiment, the data 302 may be stored in one or more pages 304, e.g., pages 1 to x, where x is the total number of pages of data being written to the NVM 210. Each page 304 may be associated with one or more entries 306 of the L2P mapping table 305 identifying a logical block address (LBA) 308, a physical address 310 associated with the data written to the NVM, and a length 312 of the data. LBA 308 may be a logical address specified in a write command for the data received from the host device. Physical address 310 may indicate the block and the offset at which the data associated with LBA 308 is physically written. Length 312 may indicate a size of the written data (e.g., 4 KB or some other size).

Referring back to FIG. 2, the volatile memory 218 also stores a cache 222 for the storage device 202. The cache 222 includes entries showing the mapping of logical addresses specified for data requested by the host 204 to physical addresses in NVM 210 indicating the location(s) where the data is stored. This mapping may be performed by the controller 223. When the controller 223 receives a read command or a write command for data 219, the controller checks the cache 222 for the logical-to-physical mapping of each data. If a mapping is not present (e.g., it is the first request for the data), the controller accesses the L2P mapping table 220 and stores the mapping in the cache 222. When the controller 223 executes the read command or write command, the controller accesses the mapping from the cache and reads the data from or writes the data to the NVM 210 at the specified physical address. The cache may be stored in the form of a table or other data structure which includes a logical address associated with each memory location 212 in NVM where data is being read.

The NVM 210 includes sense amplifiers 224 and data latches 226 connected to each memory location 212. For example, the memory location 212 may be a block including cells 216 on multiple bit lines, and the NVM 210 may include a sense amplifier 224 on each bit line. Moreover, one or more data latches 226 may be connected to the bit lines and/or sense amplifiers. The data latches may be, for example, shift registers. When data is read from the cells 216 of the memory location 212, the sense amplifiers 224 sense the data by amplifying the voltages on the bit lines to a logic level (e.g., readable as a '0' or a '1'), and the sensed data is stored in the data latches 226. The data is then transferred from the data latches 226 to the controller 223, after which the data is stored in the volatile memory 218 until it is transferred to the host device 204. When data is written to the cells 216 of the memory location 212, the controller 223 stores the programmed data in the data latches 226, and the data is subsequently transferred from the data latches 226 to the cells 216.

The storage device 202 includes a controller 223 which includes circuitry such as one or more processors for executing instructions and can include a microcontroller, a digital signal processor (DSP), an application specific integrated circuit (ASIC), a field programmable gate array (FPGA), hard-wired logic, analog circuitry and/or a combination thereof.

The controller 223 is configured to receive data transferred from one or more of the cells 216 of the various memory locations 212 in response to a read command. For example, the controller 223 may read the data 219 by activating the sense amplifiers 224 to sense the data from cells 216 into data latches 226, and the controller 223 may receive the data from the data latches 226. The controller 223 is also configured to program data into one or more of the cells 216 in response to a write command. For example, the controller 223 may write the data 219 by sending data to the data latches 226 to be programmed into the cells 216. The controller 223 is further configured to access the L2P mapping table 220 in the NVM 210 when reading or writing data to the cells 216. For example, the controller 223 may receive logical-to-physical address mappings from the NVM 210 in response to read or write commands from the host device 204, identify the physical addresses mapped to the logical addresses identified in the commands (e.g., translate the logical addresses into physical addresses), and access or store data in the cells 216 located at the mapped physical addresses.

The controller 223 and its components may be implemented with embedded software that performs the various functions of the controller described throughout this disclosure. Alternatively, software for implementing each of the aforementioned functions and components may be stored in the NVM 210 or in a memory external to the storage device 202 or host device 204 and may be accessed by the controller 223 for execution by the one or more processors of the controller 223. Alternatively, the functions and components of the controller may be implemented with hardware in the controller 223 or may be implemented using a combination of the aforementioned hardware and software.

In operation, the host device 204 stores data in the storage device 202 by sending a write command to the storage device 202 specifying one or more LBAs as well as a length of the data to be written. The host interface 206 receives the write command, and the controller allocates a memory location 212 in the NVM 210 of storage device 202 for storing the data. The controller 223 stores the L2P mapping in the NVM (and the cache 222) to map a logical address associated with the data to the physical address of the memory location 212 allocated for the data. The controller also stores the length of the L2P mapped data. The controller 223 then stores the data in the memory location 212 by sending it to one or more data latches 226 connected to the allocated memory location, from which the data is programmed to the cells 216.

The host 204 may retrieve data from the storage device 202 by sending a read command specifying one or more logical addresses associated with the data to be retrieved from the storage device 202, as well as a length of the data to be read. The host interface 206 receives the read command, and the controller 223 accesses the L2P mapping in the cache 222 or otherwise the NVM to translate the logical addresses specified in the read command to the physical addresses indicating the location of the data. The controller 223 then reads the requested data from the memory location 212 specified by the physical addresses by sensing the data using the sense amplifiers 224 and storing them in data latches 226 until the read data is returned to the host 204 via the host interface 206.

Examples of Association Rule Mining (ARM) by a Storage Controller

Figure 4:
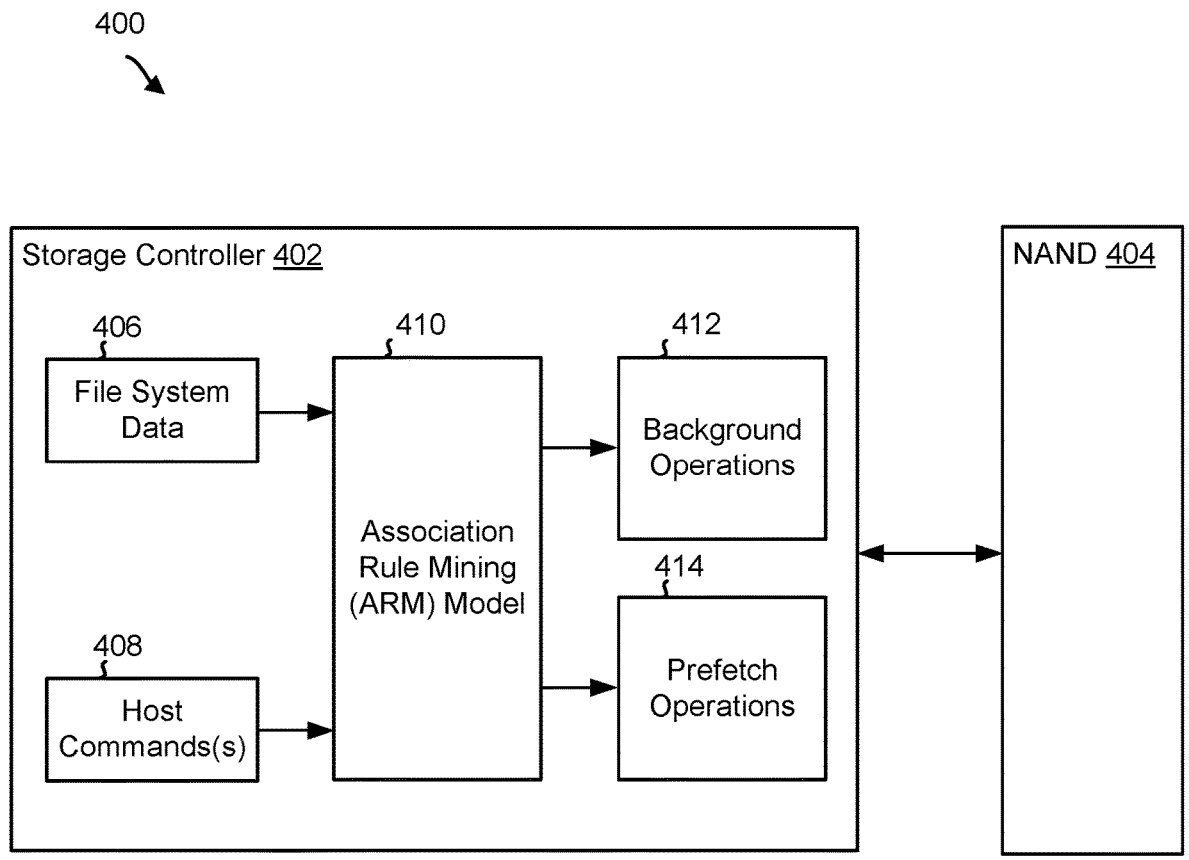
FIG. 4 is a conceptual block diagram illustrating an example of communications and functions of a storage controller.

FIG. 4 is a block diagram illustrating example storage controller 402 (e.g., storage controller 223 of FIG. 2) and NAND 404 (e.g., NVM 210 of FIG. 2) system 400. Here, the storage controller 402 includes an ARM model 410 (e.g., ARM model 233 of FIG. 2). In certain aspects, the ARM model 410 may be configured to generate associations between host commands based on: (i) file system data 406 parsed by the ARM model 410 from a file system of the host, and (ii) host commands 408. The ARM model 410 may use a market-basket analysis or any other suitable analysis model.

Conventional storage controllers may receive a write command and write data associated with the command to a random open block. In some examples, the conventional storage controller may continue to write the data to random open blocks until the write command is completed, or until the controller determines that the data has a sequential nature. If the data is determined to have a sequential nature, then the controller may write the remaining data to sequential open blocks. Because the conventional controller is not aware of any associations between the data being written (e.g., that the data being written is sequential data associated with other data being written), the conventional controller cannot store the data in a manner that will reduce overhead such as background operations 412 and prefetch operations 414.

In one example, the storage controller 402 may use the ARM model 410 to parse file system data 406 and generate associations between LBAs of the host commands 408. For example, the storage controller 402 may receive a command to write a movie file and its associated subtitle files to NAND 404 storage. Based on the file system data 406, the ARM model 410 may determine one or more of a file type, an owner, access restrictions, etc. associated with the movie file and its associated subtitle files. For example, the ARM model 410 may determine that the movie file and its associated subtitle files are sequential data, and that movie file is associated with the subtitle files (e.g., the host may request a simultaneous read of both). Accordingly, the storage controller 402 may initiate writing the movie file to sequential logical blocks (e.g., the same set of sequential logical blocks, or a first set of sequential blocks for the movie file and a second set of sequential blocks for the subtitle files).

It should be noted, by writing the files to sequential blocks, the storage controller 402 may determine a range of LBAs associated with the files from the file system, with the range of LBAs having a definitive starting address and ending address associated with each file. Accordingly, prefetching and read look-ahead (RLA) operations may be performed more efficiently because the storage controller 402 is aware of the range of LBAs associated with each file. As such, the storage controller 402 may limit its precaching operations to the range of LBAs without precaching unnecessary data (e.g., data beyond the range of LBAs).

Moreover, by writing the files to sequential blocks from the start of the write operation, the storage controller 402 may reduce or eliminate garbage collection operations in the future. As discussed above, the conventional controller may write the files to random open blocks that also contain other data. In the event the other data is erased, the conventional controller will have to move the file from the source block and write it to another block in order to erase the other data. However, by using the ARM model 410, the storage controller 402 may write the files to sequential blocks having a dedicated range of LBAs associated with the files. As a result, the files may not share blocks with other data, or the number of shared blocks will be significantly reduced.

Figure 5:
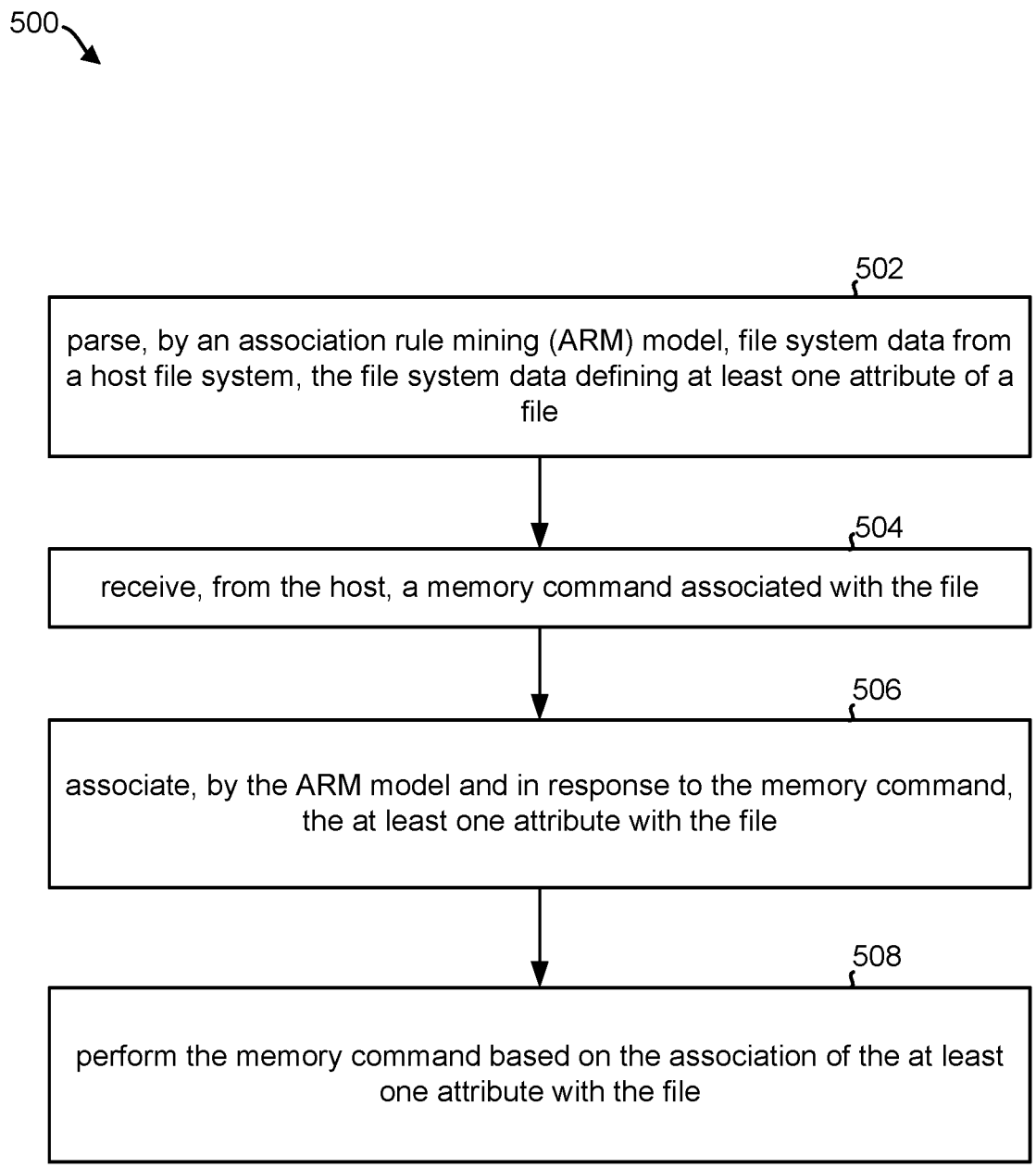
FIG. 5 is a flow diagram illustrating an example method for improving digital storage using a storage controller that utilizes an ARM model.

FIG. 5 is a flow diagram illustrating an example method 500 for improving digital storage using a storage controller that utilizes an ARM model (e.g., the ARM model 410 of FIG. 4). The method 500 can be carried out in a storage device such as the storage/memory device 120 illustrated in FIG. 1 or the storage/memory device 202 illustrated in FIG. 2. Each of the steps in the flow diagram can be controlled using a storage controller (e.g., storage/memory controller 126 of FIG. 1, or storage controller 223 of FIG. 2) as described below, by a component or module of the storage controller (e.g., association rule mining model 233 of FIG. 2), or by another suitable means. Although the method 500 is described with reference to a single host, the method 500 may be implemented with a multi-host environment (e.g., local or network).

At a first step 502, an ARM model may parse file system data from a host file system, the file system data defining at least one attribute of a file. In some examples, the file system data may include one or more attributes of one or more files, and the attributes may include an access property (e.g., read-only), an indication of file associations (e.g., other files that support or are associated with the file), a file type (e.g., file type, file extension, executables that can open the file, etc.), a file owner, a group owner, a starting logical block address (LBA), and/or a last LBA.

At a second step 504, the storage controller may receive, from the host, a memory command associated with the file. In some examples, the memory command includes one or more of a read command, a write command, and/or an erase command. For example, the host may issue a command for the storage controller to write the file to memory.

At a third step 506, the storage controller may associate, by the ARM model, the at least one attribute with the file. Here, the ARM model may determine one or more attributes that define the file. For example, the file may be defined as a movie type of file that is associated with other files. If the memory command is a read command, then the storage controller may associate the file being read with the attributes, and the LBAs of the file with LBAs of the other associated files. If the memory command is a write command, then the storage controller may associate the file being written with the attributes and determine the range of LBAs to use when writing the file based on the attributes. If the memory command is an erase command, then the storage controller may rely on attributes and/or LBAs associated with the file to be erased to determine which blocks will be subject to the erase command.

At a fourth step 508, the storage controller may perform the memory command based on the association of the at least one attribute with the file. Here, the storage controller may determine an optimum way to perform the memory operation, wherein that determination is based on the attribute(s). FIGS. 6-10 below provide several non-limiting examples of performing the memory command based on the association of a file attribute parsed by an ARM model.

In certain aspects, the memory command comprises one or more of a read command, a write command, or an erase command.

In certain aspects, the file system data comprises one or more attributes of one or more files, and wherein the one or more attributes comprise a read-only access property, an indication of file associations, a file type, a file owner, a group owner, a starting logical block address (LBA), and a last LBA.

In certain aspects, the file type comprises a sequential type or a random type.

In certain aspects, the at least one attribute is indicative of the file being read-only access, wherein the memory command is a write command, and wherein the controller is further configured to: write the file to a logical block satisfying a threshold program erase count (PEC) condition.

In certain aspects, the logical block that satisfies the threshold PEC condition has a corresponding PEC that is greater than or equal to the threshold PEC.

In certain aspects, the at least one attribute is a file type or a file association indicative of the file comprising sequential data or random data, wherein the memory command is a write command, and wherein the controller is further configured to: write the file to a sequential logical block when the file comprises sequential data; and write the file to a random logical block when the file comprises random data.

In certain aspects, the file system data comprises a link to the file, wherein the link is maintained by a distributed link tracking service (DLTS).

In certain aspects, the at least one attribute is indicative of an owner of the file, wherein the memory command is a write command, and wherein the controller is further configured to: associate a first one or more logical block addresses (LBAs) with the owner; and write the file to one or more logical blocks corresponding to the first one or more LBAs associated with the owner.

In certain aspects, the controller is further configured to: associate a second one or more LBAs with another owner; receive, from the host, a write command associated with another file; and write the other file to one or more logical blocks corresponding to the second one or more LBAs associated with the other owner.

In certain aspects, the at least one attribute is indicative of a last logical block address (LBA) indicating an end of a range of LBAs corresponding to the file, wherein the memory command is a read command, and wherein the controller is further configured to: precache data of the file from the range of LBAs; and refrain from precaching data outside the range of LBAs.

In certain aspects, data of the file corresponding to the last LBA is a final data precached in response to the read command.

In certain aspects, the at least one attribute is indicative of a last logical block address (LBA) indicating an end of a range of LBAs corresponding to the file, wherein the memory command is a read command, and wherein the controller is further configured to: estimate a time of completion of the read command based on the last LBA; and schedule one or more background tasks to begin after the estimated time of completion.

In certain aspects, the one or more background tasks comprise garbage collection and wear leveling (WL).

Figure 6:
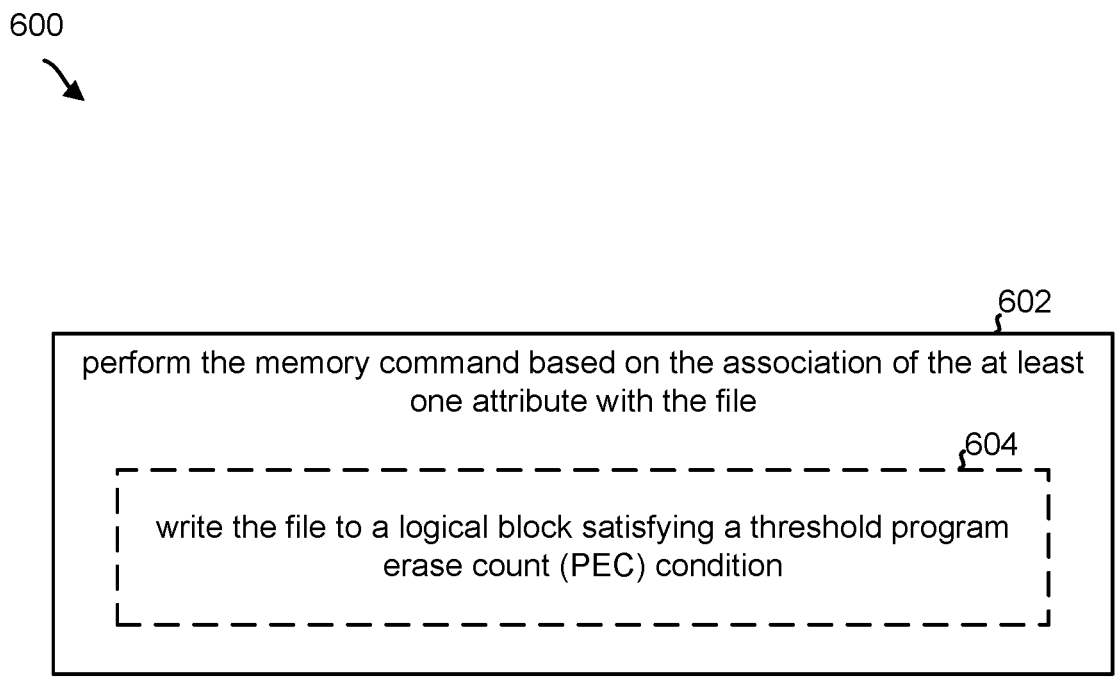
FIG. 6 is a flow diagram illustrating an example method for improving the life/endurance of a digital storage using a storage controller that utilizes an ARM model.

FIG. 6 is a flow diagram illustrating an example method 600 for improving the life/endurance of a digital storage using a storage controller that utilizes an ARM model (e.g., the ARM model 410 of FIG. 4). The method 600 can be carried out in a storage device such as the storage/memory device 120 illustrated in FIG. 1 or the storage/memory device 202 illustrated in FIG. 2. Each of the steps in the flow diagram can be controlled using a storage controller (e.g., storage/memory controller 126 of FIG. 1, or storage controller 223 of FIG. 2) as described below, by a component or module of the storage controller (e.g., ARM model 233 of FIG. 2), or by another suitable means.

At a first step 602, the storage controller may perform the memory command based on the association of the at least one attribute with the file. At a second step 604 (optional parts of the first step 602), the storage controller may write the file to a logical block satisfying a threshold program erase count (PEC) condition. The PEC is a sequence of events in which data is written to solid-state NAND flash memory cell (such as the type found in a so-called flash or thumb drive), then erased, and then rewritten. In some examples, PECs can serve as a criterion for quantifying the endurance of a flash storage device.

The ARM model may parse attributes from FS data, including access properties of the file. For example, the FS data may indicate that the file is read-only access. Based on this information, the storage controller optimizes the functionality of the storage device by grouping read-only data into logical blocks with a relatively high program erase count (PEC) (e.g., based on PEC satisfying a threshold condition, such as the PEC reaching a pre-configured value).

As discussed, NAND memory may have a finite endurance that is quantified by the PEC. That is, the cycle of writing and erasing data to NAND blocks is limited to a certain number of cycles, and writing/erasing of these blocks may be restricted after a certain number of cycles. However, because read-only data may often correspond to data that is rarely erased or modified, the read-only data may be grouped into logical blocks with higher PEC to extend the life of those blocks. Accordingly, the storage controller may write the file to logical blocks with higher PEC based on ARM model learning that the file has read-only access. By writing files with read-only access to logical blocks with higher PEC, the life/endurance of those blocks may be extended due to the fact that read-only data is rarely deleted/modified.

Figure 7:
FIG. 7 is a flow diagram illustrating an example method for grouping and optimizing garbage collection in a storage device using a storage controller that utilizes an ARM model.

FIG. 7 is a flow diagram illustrating an example method 700 for grouping and optimizing garbage collection in a storage device using a storage controller that utilizes an ARM model (e.g., the ARM model 410 of FIG. 4). The method 700 can be carried out in a storage device such as the storage/memory device 120 illustrated in FIG. 1 or the storage/memory device 202 illustrated in FIG. 2. Each of the steps in the flow diagram can be controlled using a storage controller (e.g., storage/memory controller 126 of FIG. 1, or storage controller 223 of FIG. 2) as described below, by a component or module of the storage controller (e.g., ARM model 233 of FIG. 2), or by another suitable means.

At a first step 702, the storage controller may perform the memory command based on the association of the at least one attribute with the file. At a second step 704 and a third step 706 (optional parts of the first step 702), the storage controller may write the file to sequential logical blocks (e.g., logical blocks having sequential logical block addresses (LBAs)) when the file comprises sequential data, and write the file to random logical blocks, respectively.

For example, an NTFS file system may provide a link tracking service, such as a DLTS configured to track and maintain shortcut links and/or OLE information as files or objects corresponding to a link are modified or moved. A distributed link tracking client (e.g., TrkWks) associated with the link tracking service may maintain object links between FS files (e.g., within a computer or across computers in a network domain) and a directory of the FS files on the storage device. Such links may use an object ID uniquely identifying a file and/or directory on the storage device. The ARM model may collect and parse FS data from the links to determine properties of one or more files stored on the storage device. For example, link data may provide a relationship between files on the computer network (e.g., file type) and information that can be used for prefetching. In certain aspects, the ARM model may use the link data to associate a "file type" with multiple files that are subject to a memory command, and group the multiple files according to file type.

Typically, a storage controller may store unrelated data (e.g., gaming data and movie data) in the same logical block. Gaming data may be random data that is erased when the game is over, whereas movie data may be kept until the user decides to remove it. Accordingly, when the game is over, the gaming data may be erased as part of a garbage collection or as part of a memory command. As such, if the gaming data is stored on the same block as the movie data, then the storage device may have to perform a garbage collection procedure to move the movie data to another available block in order to erase the block containing the gaming data.

Such garbage collection processes may be avoided if the movie data and the gaming data are segregated and stored on different blocks. Thus, in the example illustrated, the ARM model may determine, based on FS data parsed from links between the file system within a host or across multiple hosts in a network, that the at least one attribute is a file type or a file association indicative of the file comprising sequential data or random data. For example, the FS data may indicate that the movie is sequential data (e.g., the file is data in a sequence of movie data) and the gaming data is random data. Thus, based on the FS data parsed from the link information by the ARM, the storage controller may segregate file data across different blocks according to the file type. Here, the movie file may be segregated to a sequential block, and the gaming data may be segregated and stored to a random block. Accordingly, when the game is over and the gaming data is erased, minimal or no garbage collection is required to erase the gaming data because like-types of files may be grouped in common blocks.

FIG. 8 is a flow diagram illustrating an example method 800 for grouping and optimizing garbage collection in a storage device using a storage controller that utilizes an ARM model (e.g., the ARM model 410 of FIG. 4). The method 800 can be carried out in a storage device such as the storage/memory device 120 illustrated in FIG. 1 or the storage/memory device 202 illustrated in FIG. 2. Each of the steps in the flow diagram can be controlled using a storage controller (e.g., storage/memory controller 126 of FIG. 1, or storage controller 223 of FIG. 2) as described below, by a component or module of the storage controller (e.g., ARM model 233 of FIG. 2), or by another suitable means.

At a first step 802, the storage controller may perform the memory command based on the association of the at least one attribute with the file. At a second step 804 and a third step 806 (optional parts of the first step 802), the storage controller may associate a first one or more logical block addresses (LBAs) with the owner, and write the file to the first one or more logical blocks associated with the owner, respectively.

In this example, the ARM model may parse FS data that provides at least one attribute of the file, wherein that attribute is indicative of an owner of the file. Here, the ARM may use the FS data to group file data in the storage device based on one or more of an owner or group owner of the stored file data. Accordingly, the storage controller may consolidate logical data together in logical blocks for to improve performance of the storage device. For example, FS data (e.g., data that is stored with the host) may include information about host files in the storage device, including "file owner" and/or "group owner." The ARM may parse this FS data, and the storage controller may associate a range of logical addresses with a particular owner. As such, data stored on the storage device may be segregated according to an owner of the data.

At a fourth step 808, a fifth step 810, and a sixth step 812 (optional parts of the first step 802), the storage controller may associate a second one or more LBAs with another owner; receive, from the host, a write command associated with another file; and write the other file to the second one or more LBAs associated with the other owner. In this example, a first owner and a second owner each own corresponding files stored on the storage device. If the files of the first owner and the second owner are stored in a manner where they are not segregated by owner, and the first owner decides to erase all his files, then there may be a need for the storage controller to perform extensive garbage collection to separate the valid files of the second owner from files of the first owner so that the first owners' files can be deleted. However, if the files are segregated by owner, garbage collection may be eliminated or reduced because the files of the first owner are not intermingled in blocks with the files of the second owner.

Figure 9:
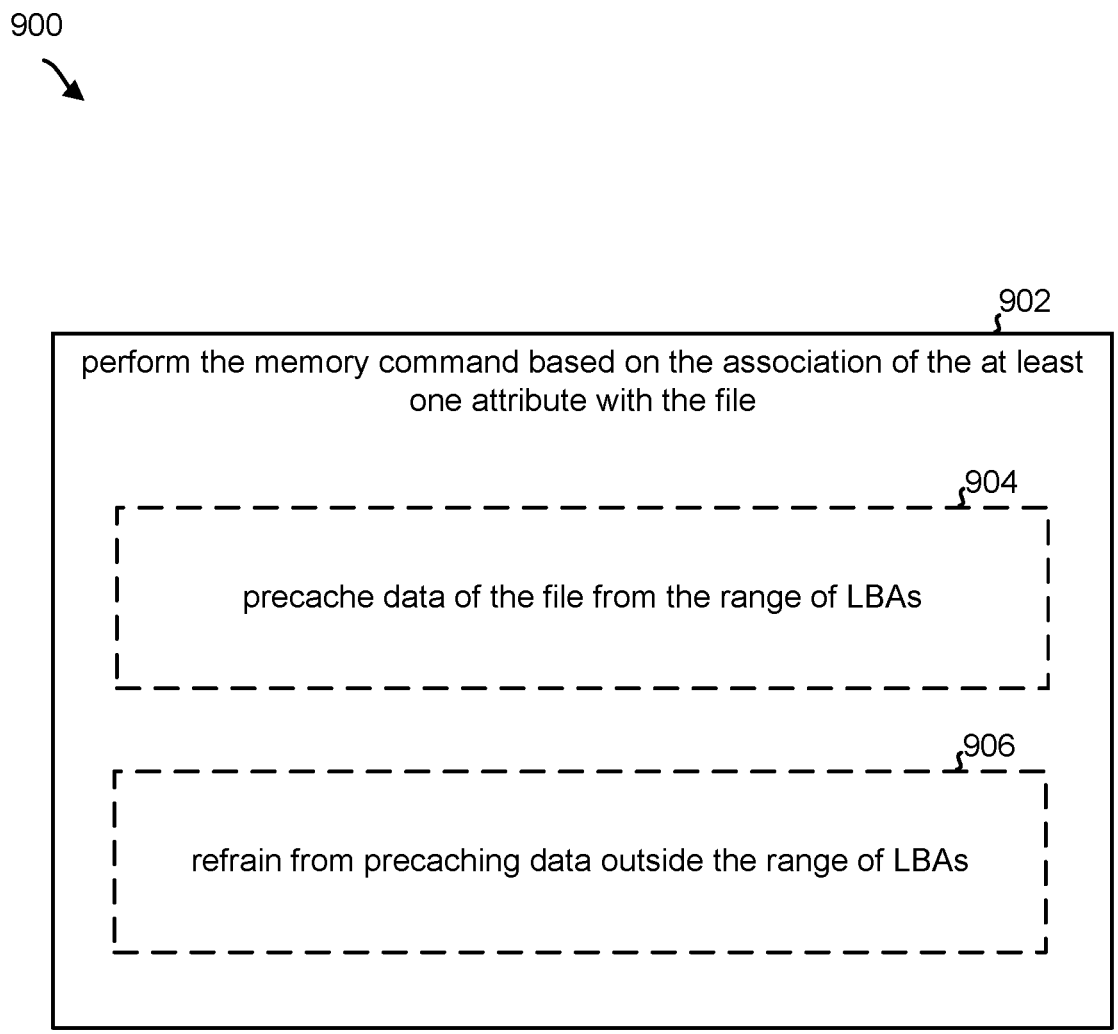
FIG. 9 is a flow diagram illustrating an example method for optimizing precaching (e.g., read look ahead (RLA)) using a storage controller that utilizes an ARM model.

FIG. 9 is a flow diagram illustrating an example method 900 for optimizing precaching (e.g., RLA) using a storage controller that utilizes an ARM model (e.g., the ARM model 410 of FIG. 4). The method 900 can be carried out in a storage device such as the storage/memory device 120 illustrated in FIG. 1 or the storage/memory device 202 illustrated in FIG. 2. Each of the steps in the flow diagram can be controlled using a storage controller (e.g., storage/memory controller 126 of FIG. 1, or storage controller 223 of FIG. 2) as described below, by a component or module of the storage controller (e.g., ARM model 233 of FIG. 2), or by another suitable means.

At a first step 902, the storage controller may perform the memory command based on the association of the at least one attribute with the file. At a second step 904 and a third step 906 (optional parts of the first step 902), the storage controller may precache data of the file from the range of LBAs, and refrain from precaching data outside the range of LBAs, respectively. For example, if the memory command is a read command for a movie file or other sequential data file, and the at least one attribute is indicative of a last logical block address (LBA) indicating an end of a range of LBAs corresponding to the file, then the memory controller may determine when the movie begins and when it ends, and estimate a time that the host will stop issuing read commands (e.g., when the last LBA is read). This is because the data of the file corresponding to the last LBA is the final data precached in response to the read command. Thus, the storage controller may perform prefetching operations to prefetch data related to the file but may stop the prefetching operations after prefetching the last LBA. Whereas conventional storage controllers may continue to prefetch data because they do not have the means to determine the last LBA associated with a sequential file. Similarly, by knowing the last LBA, the storage controller may predict a next idle time, and may schedule background processes to occur during the estimated idle time.

Figure 10:
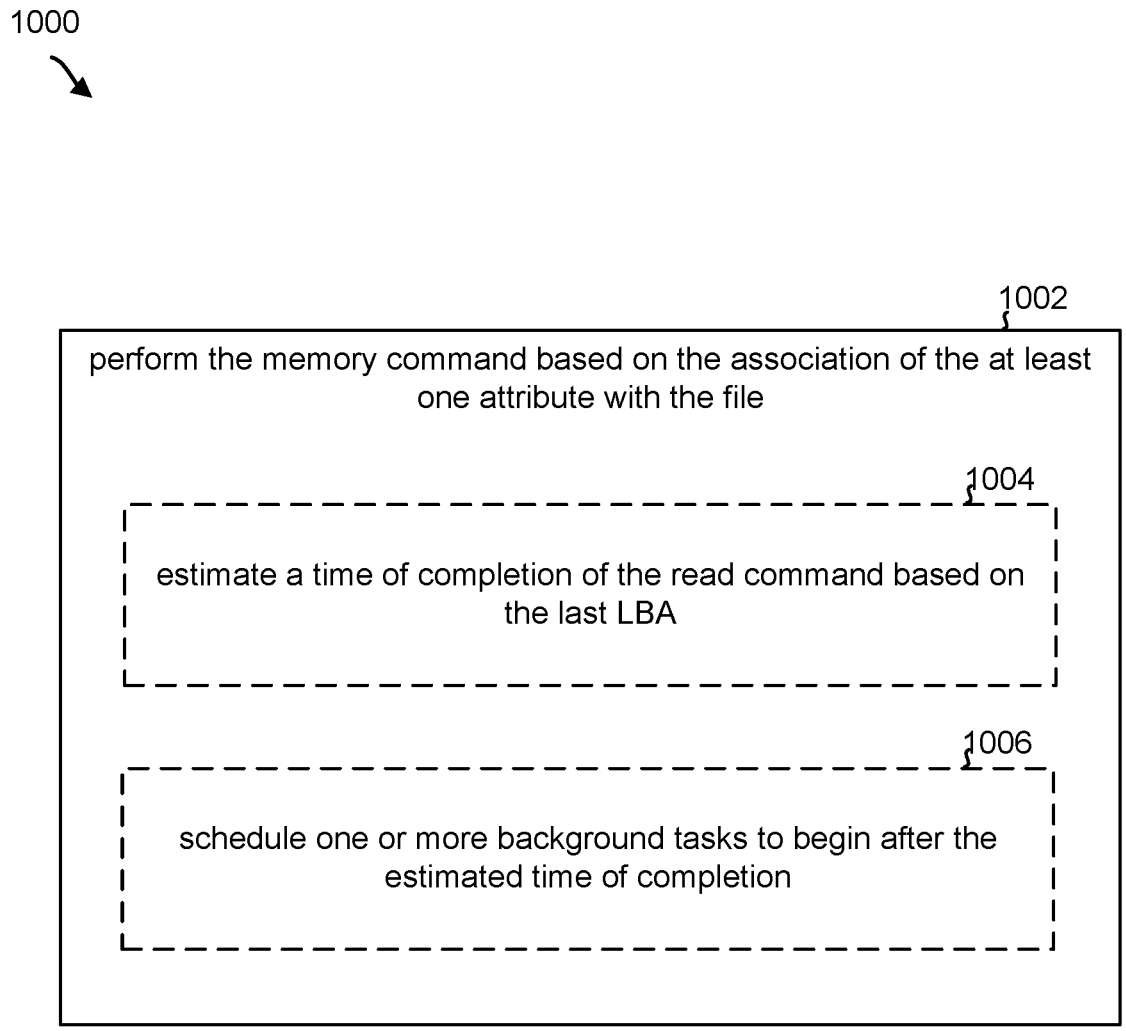
FIG. 10 is a flow diagram illustrating an example method for estimating idle time using a storage controller that utilizes an ARM model.

FIG. 10 is a flow diagram illustrating an example method 1000 for estimating idle time using a storage controller that utilizes an ARM model (e.g., the ARM model 410 of FIG. 4). The method 1000 can be carried out in a storage device such as the storage/memory device 120 illustrated in FIG. 1 or the storage/memory device 202 illustrated in FIG. 2. Each of the steps in the flow diagram can be controlled using a storage controller (e.g., storage/memory controller 126 of FIG. 1, or storage controller 223 of FIG. 2) as described below, by a component or module of the storage controller (e.g., ARM model 233 of FIG. 2), or by another suitable means.

At a first step 1002, the storage controller may perform the memory command based on the association of the at least one attribute with the file. At a second step 1004 and a third step 1006 (optional parts of the first step 1002), the storage controller may estimate a time of completion of the read command based on the last LBA, and schedule one or more background tasks to begin after the estimated time of completion, respectively.

Similar to the example illustrated in FIG. 9, if the at least one attribute is indicative of an LBA indicating an end of a range of LBAs corresponding to the file, then the storage controller may use FS data parsed by the ARM model to estimate an idle time, during which the storage device or aspects of the storage device (e.g., the storage controller) may enter into a low power or idle state of operation. For example, the ARM may parse FS data indicating characteristics of certain files (e.g., file types, owners, file associations, etc.). Accordingly, the ARM may determine that a particular file request is associated with a movie, and the ARM may determine the last LBA of the movie. Based on this information, the storage controller may estimate a time that the movie will end. Based on the estimated time, the storage controller may schedule background operations (e.g., garbage collection and/or any other suitable background operation of a storage device) to begin at a time associated with the end of the movie (e.g., a time when requests for movie data from the host will end).

Figure 11:
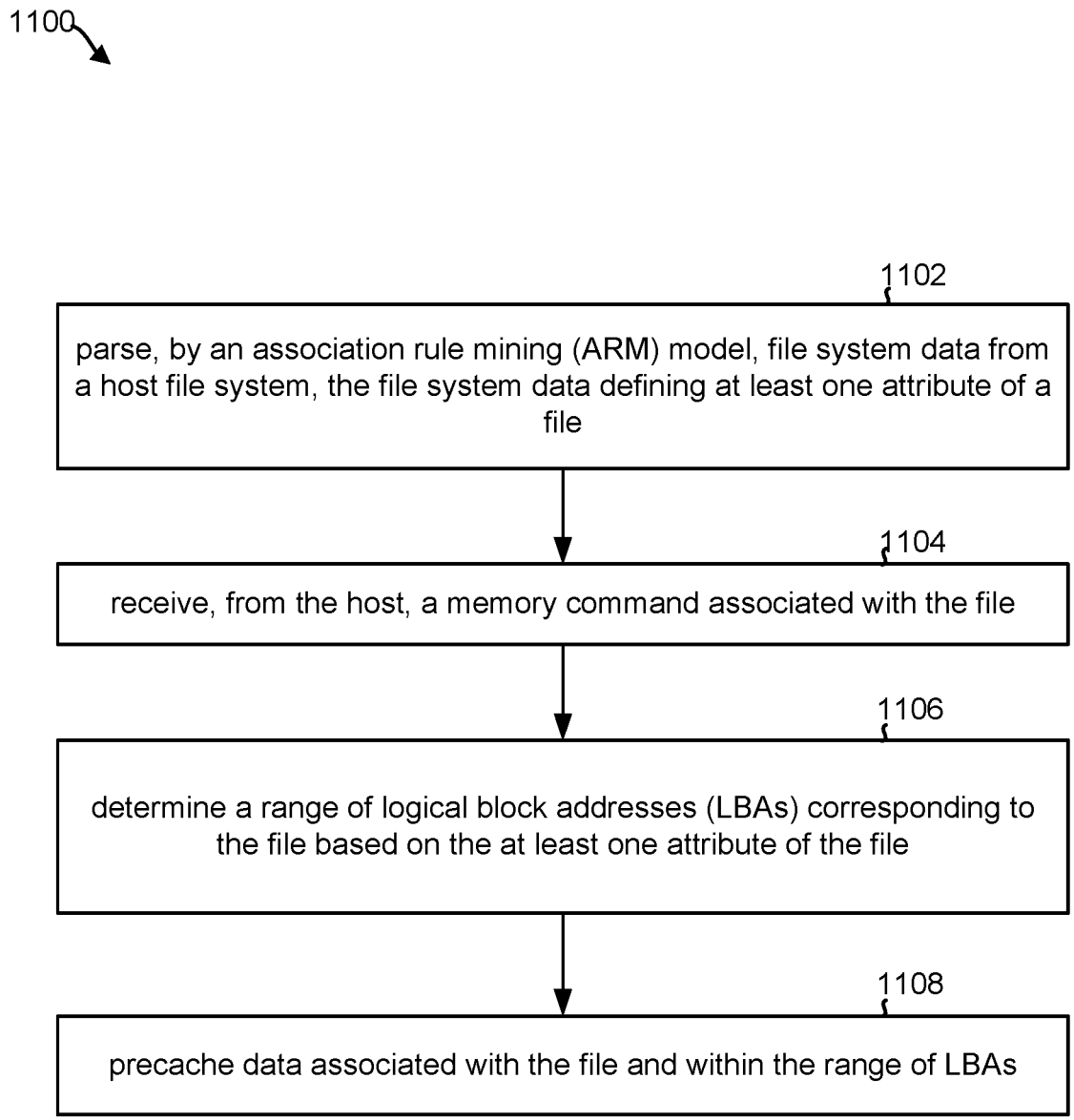
FIG. 11 is a flow diagram illustrating an example method for improving digital storage using a storage controller that utilizes an ARM model.

FIG. 11 is a flow diagram illustrating an example method 1100 for improving digital storage using a storage controller that utilizes an ARM model. At a first step 1102, the controller may parse, by an association rule mining (ARM) model, file system data from a host file system, the file system data defining at least one attribute of a file. That is, the device may parse the file system and see what attributes are associated with the file.

In a second step 1104, the controller may receive, from the host, a memory command associated with the file. For example, the controller may receive a read command (e.g., to read the file from memory), a write command (e.g., modify or write over the file), etc.

In a third step 1106, the controller may determine a range of logical block addresses (LBAs) corresponding to the file based on the at least one attribute of the file. For example, the controller may use the data parsed from the file system to determine the range of LBAs (e.g., including a beginning LBA and a last LBA of the range).

In a fourth step 1108, the controller may precache data associated with the file and within the range of LBAs. Stated differently, the file system data may be used to optimize precaching of L2P pages. In one example, using FS data, the ARM may determine that a 1 GB file begins at LBA X and ends at LBA Y. Thus, if the host issues a read command for reading the movie data, the storage controller will know that it may precache or perform RLA up to LBA Y. That is, the storage controller may stop precaching or restrict RLA so that no precaching is performed beyond LBA Y. In this example, X and Y are LBA addresses.

In certain aspects, the memory command is a read command.

In certain aspects, the at least one attribute is indicative of a last LBA of the range of LBAs corresponding to the file.

In certain aspects, the data of the file corresponding to the last LBA is a final data precached in response to the read command.

In certain aspects, the controller, being configured to precache data associated with the file and within the range of LBAs, is further configured to refrain from precaching data outside the range of LBAs.

Figure 12:
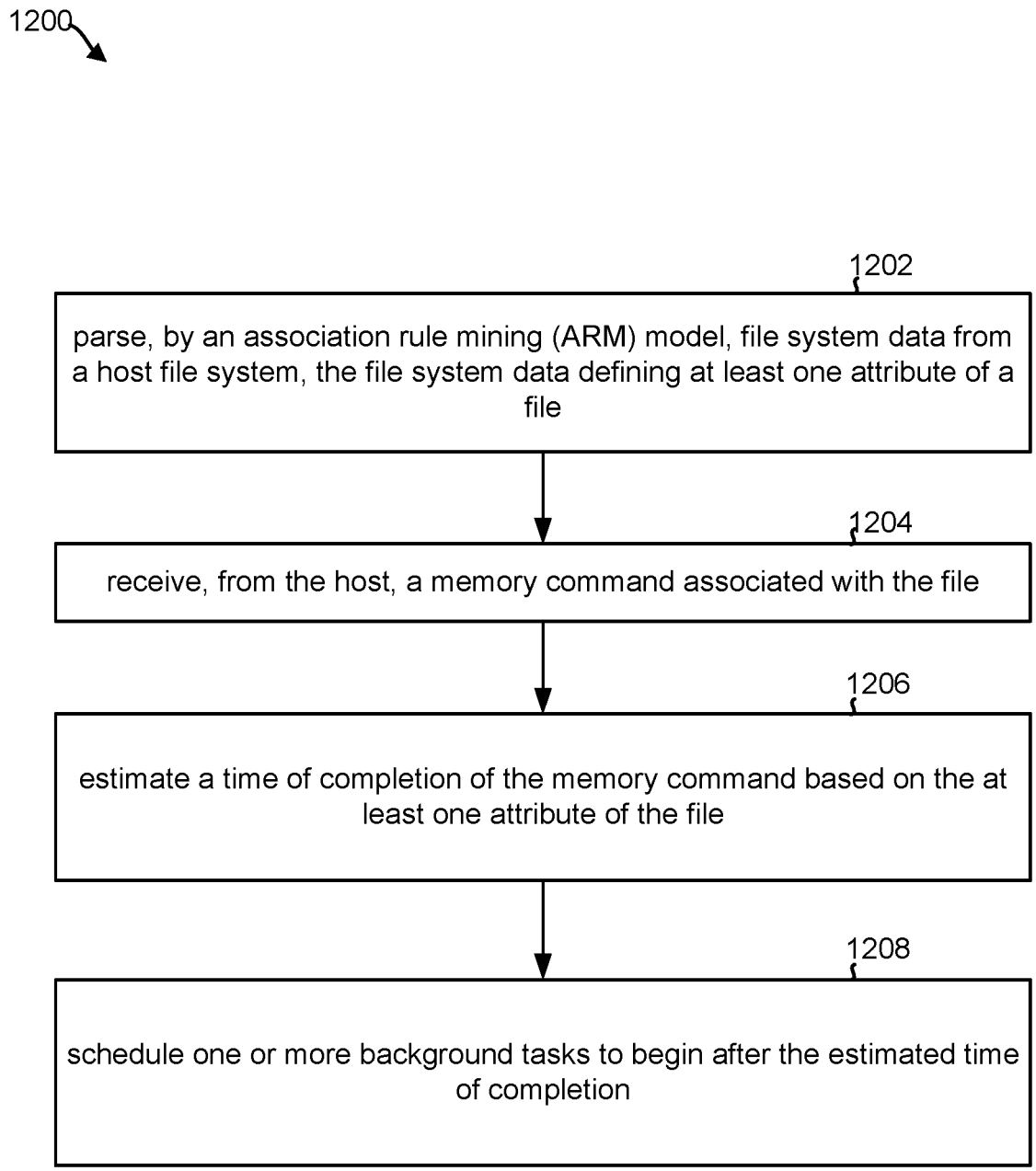
FIG. 12 is a flow diagram illustrating an example method for improving digital storage using a storage controller that utilizes an ARM model.

FIG. 12 is a flow diagram illustrating an example method 1200 for improving digital storage using a storage controller that utilizes an ARM model. At a first step 1202, the controller may parse, by an association rule mining (ARM) model, file system data from a host file system, the file system data defining at least one attribute of a file. That is, the device may parse the file system and see what attributes are associated with the file.

At a second step 1204, the controller may receive, from the host, a memory command associated with the file. For example, the controller may receive a read command (e.g., to read the file from memory), a write command (e.g., modify or write over the file), etc.

At a third step 1206, the controller may estimate a time of completion of the memory command based on the at least one attribute of the file. For example, the controller may estimate the time of completion based on a determined range of LBAs.

At a fourth step 1208, the controller may schedule one or more background tasks to begin after the estimated time of completion. Stated differently, the ARM may use the file system data to estimate idle time, during which the storage device or aspects of the storage device (e.g., the storage controller) may enter into a low power or idle state of operation. For example, the ARM may parse file system data that includes an indication of characteristics of certain files (e.g., file types, owners, file associations, etc.). Accordingly, the ARM may determine that a particular file request is associated with a movie, and the ARM may determine the last LBA of the movie. Based on this information, the storage controller may estimate a time that the movie will end. Based on this time, the storage controller may schedule background operations (e.g., garbage collection and/or any other suitable background operation of a storage device) to begin at a time associated with the end of the movie (e.g., a time when requests for movie data from the host will end).

In certain aspects, the one or more background tasks comprise one or more of garbage collection, read scrub, memory refresh, and wear leveling (WL).

In certain aspects, the memory command is a read command.

In certain aspects, the controller is further configured to determine a range of logical block addresses (LBAs) corresponding to the file based on the at least one attribute of the file.

In certain aspects, the time of completion is estimated based on the range of LBAs.

Figure 13:
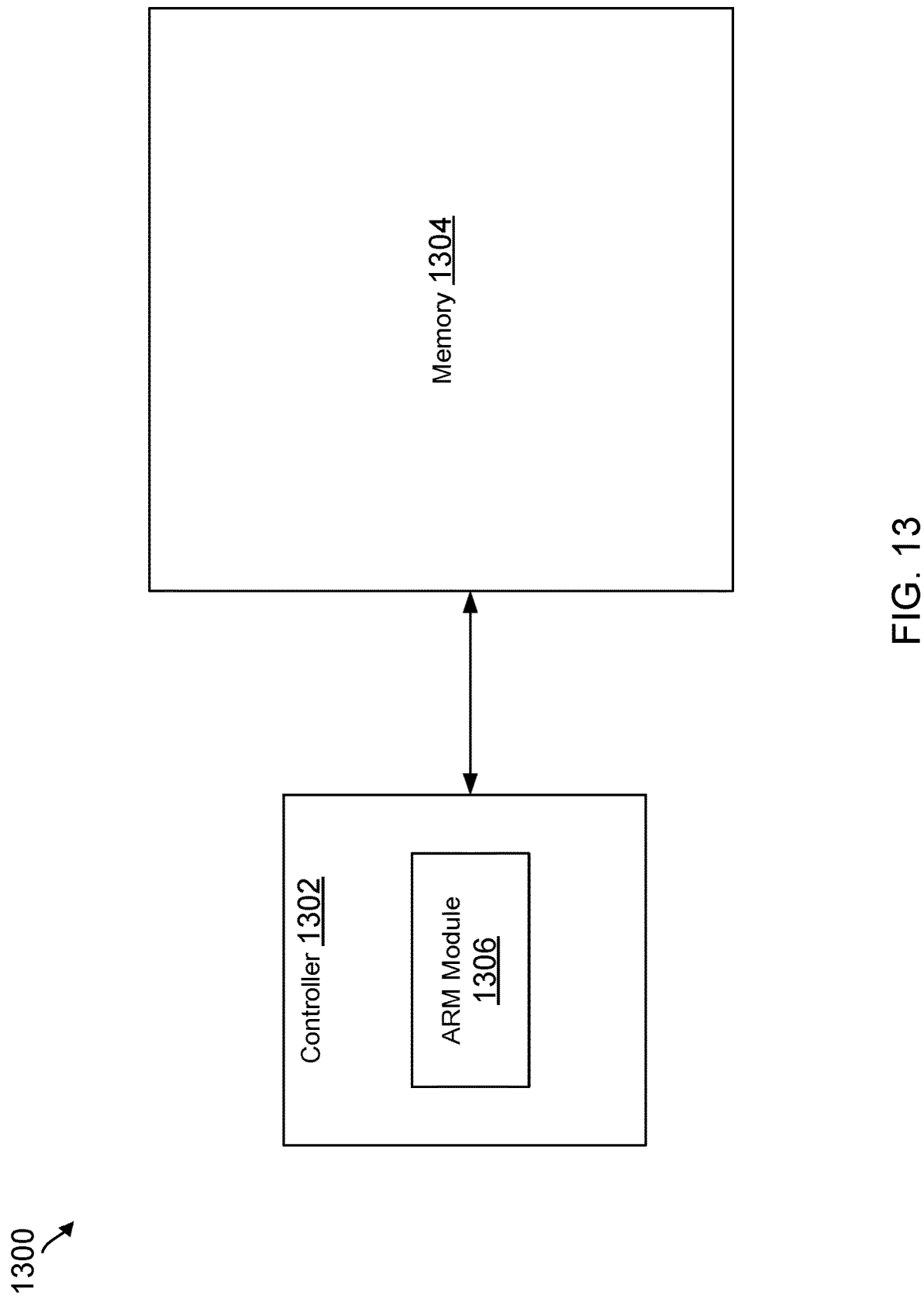
FIG. 13 is a conceptual diagram illustrating an example of a controller that facilitates use of an ARM model to control, at least in part, storage controller functions.

FIG. 13 is a conceptual diagram 1300 illustrating an example of a controller 1302 that writes/reads/erases data to/from a block based at least in part on data collected and/or parsed by an ARM model in the storage device 120 of FIG. 1. As illustrated in FIG. 13, a controller 1302 coupled to a memory 1304 (e.g., NAND) in a storage device. For example, controller 1302 may correspond to controller 126/223 and memory 1304 may correspond to the NVM 210 of the storage device 202 in FIG. 2. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

The ARM module 1306 may provide means for performing the aforementioned processes described in FIGS. 5-12.

For example, the ARM module 1306 may provide a means for parsing file system data from a host file system, the file system data defining at least one attribute of a file; means for receiving, from the host, a memory command associated with the file; means for associating, by the ARM model and in response to the memory command, the at least one attribute with the file; and means for performing the memory command based on the association of the at least one attribute with the file, as shown in FIG. 5.

In another example, the ARM module 1306 may also provide means for parsing, by an association rule mining (ARM) model, file system data from a host file system, the file system data defining at least one attribute of a file; means for receiving, from the host, a memory command associated with the file; means for determining a range of logical block addresses (LBAs) corresponding to the file based on the at least one attribute of the file; and means for precaching data associated with the file and within the range of LBAs, as shown in FIG. 11.

In another example, the ARM module 1306 may also provide means for parsing, by an association rule mining (ARM) model, file system data from a host file system, the file system data defining at least one attribute of a file; means for receiving, from the host, a memory command associated with the file; means for estimating a time of completion of the memory command based on the at least one attribute of the file; and means for scheduling one or more background tasks to begin after the estimated time of completion, as shown in FIG. 12.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:
1. A storage device, comprising:
a memory; and
a controller coupled to the memory and configured to:
parse, by an association rule mining (ARM) model, file system data from a host file system, the file system data defining at least one attribute of a first file and at least one attribute of a second file;
receive, from the host, (i) a first memory command associated with the first file and comprising an indication of a first logical block address (LBA) corresponding to the first file, and (ii) a second memory command associated with the second file and comprising an indication of a second LBA corresponding to the second file;
determine, by the ARM model and in response to the first memory command and the second memory command, an association between the first file and the second file based on: (i) the first LBA and the second LBA, and (ii) the at least one attribute of the first file and the at least one attribute of a second file; and perform the first memory command and the second memory command based on the association between the first file and the second file.

2. The storage device of claim 1, wherein each of the first memory command and the second memory command comprises one or more of a read command, a write command, or an erase command.

3. The storage device of claim 1, wherein the file system data comprises one or more attributes of one or more files including the first file and the second file, and wherein the one or more attributes comprise a read-only access property, an indication of file associations, a file type, a file owner, a group owner, a starting logical block address (LBA), and a last LBA.

4. The storage device of claim 3, wherein the file type comprises a sequential type or a random type.

5. The storage device of claim 1, wherein the at least one attribute of the first file is indicative of the first file being read-only access, wherein the first memory command is a write command, and wherein the controller is further configured to:

write the first file to a logical block satisfying a threshold program erase count (PEC) condition.

6. The storage device of claim 5, wherein the logical block that satisfies the threshold PEC condition has a corresponding PEC that is greater than or equal to the threshold PEC.

7. The storage device of claim 1, wherein the at least one attribute of the first file and the at least one attribute of the second file is a file type or a file association indicative of the first file and the second file comprising sequential data or random data, wherein the first memory command and the second memory command are write commands, and wherein the controller is further configured to:

write the first file to a first sequential logical block and write the second file to a second sequential logical block when the first file and the second file comprise sequential data; and write the first file to a first random logical block and write the second file to a second random logical block when the first file and the second file comprise random data.

8. The storage device of claim 7, wherein the file system data comprises a link to the first file, and wherein the link is maintained by a distributed link tracking service (DLTS).

9. The storage device of claim 1, wherein the at least one attribute of the first file is indicative of an owner of the first file, wherein the first memory command is a write command, and wherein the controller is further configured to:

associate the first LBA with the owner; and write the first file to one or more logical blocks corresponding to a physical address associated with the owner.

10. The storage device of claim 9, wherein the controller is further configured to:

associate the second LBA with another owner; and write the second file to another physical address corresponding to the other owner.

11. A storage device, comprising:

a memory; and a controller coupled to the memory and configured to:

receive, from a host, a read command associated with a file;

parse, by an association rule mining (ARM) model, file system data from a file system of the host, and logical block address (LBA) information from the read command;

determine a range of LBAs corresponding to the file based on the file system data and the LBA information, the range of LBAs comprising a starting LBA and a last LBA of the file;

precache data associated with the file and within the range of LBAs; and refrain from precaching data outside the range of LBAs.

12. The storage device of claim 11, wherein data of the file corresponding to the last LBA is a final data precached in response to the read command.

* * * * *